(12) United States Patent
Pohlman et al.

(10) Patent No.: US 7,201,973 B2
(45) Date of Patent: Apr. 10, 2007

(54) BIMETALLIC PLATE-FIN TITANIUM BASED HEAT EXCHANGER

(75) Inventors: Matthew J. Pohlman, Huntington Beach, CA (US); Salvador L. Hernandez, Chatsworth, CA (US); Nikolay Lewucky, Arcadia, CA (US); Edward S. Tai, Torrance, CA (US)

(73) Assignee: Honeywell International, Inc., Morristown, NJ (US)

( * ) Notice: Subject to any disclaimer, the term of this patent is extended or adjusted under 35 U.S.C. 154(b) by 504 days.

(21) Appl. No.: 10/733,133

(22) Filed: Dec. 10, 2003

(65) Prior Publication Data
US 2005/0126769 A1     Jun. 16, 2005

(51) Int. Cl.
*F28F 21/08* (2006.01)
*F28F 3/00* (2006.01)
*B32B 3/12* (2006.01)
*B32B 15/01* (2006.01)
*B32B 15/04* (2006.01)

(52) U.S. Cl. .............. 428/661; 428/593; 428/594; 428/615; 428/635; 165/166

(58) Field of Classification Search ............ None
See application file for complete search history.

(56) References Cited

U.S. PATENT DOCUMENTS

| | | | |
|---|---|---|---|
| 2,952,445 A | 9/1960 | Ladd | |
| 3,552,448 A * | 1/1971 | Springfield | 139/161 S |
| 4,427,461 A * | 1/1984 | Kindlimann | 148/220 |
| 4,497,363 A * | 2/1985 | Heronemus | 165/95 |
| 4,714,107 A * | 12/1987 | Adsett | 165/166 |
| 4,725,509 A | 2/1988 | Ryan | |
| 5,553,770 A | 9/1996 | Jha et al. | |
| 6,149,051 A * | 11/2000 | Vollmer et al. | 228/262.72 |

(Continued)

FOREIGN PATENT DOCUMENTS

EP    1 008 828 A    6/2000

(Continued)

OTHER PUBLICATIONS

Shapiro, A., et al., "State of the Art Titanium-Based Brazing Filler Metals", Oct. 2003, pp. 36-43, vol. 82, No. 10, American Welding Society, Miami.

(Continued)

*Primary Examiner*—Jennifer C. McNeil
*Assistant Examiner*—Jason L. Savage
(74) *Attorney, Agent, or Firm*—Oral Caglar, Esq.

(57) ABSTRACT

A heat exchanger of the plate-fin type has fins of one metal brazed to a plate made of a different metal for use in oil coolers, condensers, evaporators, and the like. The distortion-prone titanium fins of conventional heat exchangers may be replaced with another metal, such as a stainless steel or a nickel based alloy to provide a structure that is resistant to crushing at the brazing temperature. Fluid or air flow resistance (pressure drop) through the heat exchanger may also be improved if the selected fin metal forms better fin shapes and has fewer burrs than conventional titanium fins. The replacement material may also improve the heat transfer performance of the heat exchanger if the selected fin metal has higher thermal conductivity than titanium.

38 Claims, 3 Drawing Sheets

U.S. PATENT DOCUMENTS

| | | | |
|---|---|---|---|
| 6,168,069 B1 | 1/2001 | Lorenz | |
| 6,503,640 B2 | 1/2003 | Wittebrood et al. | |
| 6,544,662 B2 | 4/2003 | Rabinkin et al. | |
| 2001/0054500 A1 | 12/2001 | Raybould | |
| 2003/0155409 A1* | 8/2003 | Dockus et al. | 228/245 |
| 2004/0069837 A1* | 4/2004 | Fujiyama et al. | 228/183 |
| 2005/0011936 A1* | 1/2005 | Raybould et al. | 228/245 |
| 2005/0161494 A1* | 7/2005 | Matsu | 228/183 |
| 2006/0102696 A1* | 5/2006 | Graham et al. | 228/101 |

FOREIGN PATENT DOCUMENTS

| | | |
|---|---|---|
| GB | 2 073 395 A | 10/1981 |
| JP | 57-209773 | * 12/1982 |
| WO | WO 97/43082 | 11/1997 |

OTHER PUBLICATIONS

International Search Report dated May 31, 2005.

* cited by examiner

BIMETALLIC PLATE-FIN TITANIUM BASED HEAT EXCHANGER

BACKGROUND OF THE INVENTION

The present invention generally relates to a heat exchanger of the plate-fin type for use in oil coolers, condensers, evaporators, etc., and more particularly to a heat exchanger of the plate-fin type having fins of one metal brazed to a plate made of a different metal.

The plate-fin type heat exchanger has a large area of heat transfer per unit area and a high coefficient of heat transfer, and therefore, has an advantage in that it is compact and relatively easy to manufacture in comparison with other types. Also, the plate-fin type heat exchanger has a wide range of design variations available, such as the fin pitch, the fin height and the fin shape. These variations may be chosen to provide a heat exchanger suitable for the nature and the purpose of the fluid flowing through each passage.

Referring to FIG. 1, a conventional plate-fin heat exchanger 100 may be made by brazing a first set of fins 110 to a one side of a metal plate member 120. A second set of fins 130 may be brazed to the other side of metal plate member 120. Fins 110 and 130 may be configured to provide a counter-current flow (not shown) or a cross-current flow between the first set of fins 110 and the second set of fins 130. Flat plates 140, 150 may be brazed to fins 130 and 110, respectively, to provide cross or counter-current-flowing fluid passages A and B.

Titanium alloys have been used to make these conventional plate-fin heat exchangers due to the light weight and high heat capacity of the material. These conventional heat exchangers, however, can have a problem with fin distortion during the brazing step in the manufacturing process. Titanium fins that are tall, thin and widely spaced cannot support the loads imposed on them by the fixture and heat exchanger sections on top of them. This often leads to crushing of the fins and unbrazed areas within the heat exchanger. Furthermore, tall fins are difficult to form out of titanium due to cracking and the presence of burrs on offset fins.

Titanium alloys also have a relatively low thermal conductivity and that is especially true of the high strength alloys. Commercially pure (CP) titanium has the highest conductivity but it also has the lowest strength which may not be suitable for a heat exchanger component. Higher conductivity fin materials of a different base metal can increase the performance of a heat exchanger.

U.S. Pat. No. 4,725,509 describes a braze filler and method of brazing where the filler is a titanium-copper-nickel alloy and the parent metal is titanium, nickel, cobalt or an iron-based alloy. The braze filler used in the brazing method of the patent requires a temperature of at least 1700° F. (column 3, lines 1–5). Brazing at this temperature, however, may cause the filler to erode some titanium base metals, and thus, may not prove useful as a brazing method for dissimilar metals when one of the metals is a titanium alloy.

U.S. Pat. No. 6,168,069 describes a method of joining cylindrical shapes of titanium to stainless steel using a silver-copper-palladium braze. Silver, however, is not desirable in contact with titanium due to a potential for embrittlement of the titanium when in contact with liquid or solid silver. Moreover, the brazing method of this patent requires the joint be configured so that it is in compression after brazing. Finally, the brazing method of this patent requires that the joint be fitted together and the filler metal be placed outside the joint prior to brazing. Placing brazing filler outside of the joint may not be practical when creating the thousands of fin-to-tube sheet joints as is present inside a plate-fin type heat exchanger.

As can be seen, there is a need for an improved plate-fin titanium based heat exchanger that uses materials resistant to crushing at the brazing temperature while being simple to design and manufacture.

SUMMARY OF THE INVENTION

In one aspect of the present invention, a heat exchanger comprises a plurality of plate members; a first set of fins brazed between two of the plurality of plate members, with a braze filler, to form a first fluid passageway therein, wherein the first set of fins is made of a base metal different from the plurality of plate members; and a second set of fins brazed between one of the plate members, brazed to the first set of fins and another plate member, with the braze filler, to form a second fluid passageway therein, wherein the second set of fins is made of a base metal similar to or different from the plurality of plate members.

In another aspect of the present invention, a heat exchanger comprises a plurality of plate members made of titanium or a titanium-based alloy; a first set of fins brazed between two of the plurality of plate members, with a braze filler, to form a first fluid passageway therein; the first set of fins being made of a base metal different from the plurality of plate members; a second set of fins brazed between one of the plate members brazed to the first set of fins and another plate member, with the braze filler, to form a second fluid passageway therein; the second set of fins made of a base metal similar to or different from the plurality of plate members; and the braze filler is able to braze materials at a temperature of less than 1700° F.

In yet another aspect of the present invention, a plate-fin type heat exchanger comprises a plurality of plate members made of titanium or a titanium-based alloy; a first set of fins brazed between two of the plurality of plate members, with a braze filler, to form a first fluid passageway therein; the first set of fins being made of a base metal different from the plurality of plate members; a second set of fins brazed between one of the plate members brazed to the first set of fins and another plate member, with the braze filler, to form a second fluid passageway therein; the second set of fins made of a base metal similar to or different from the plurality of plate members; the braze filler is composed of about 40% Ti, 20% Zr, 20% Cu and 20% Ni; and the first set of fins are made of a metal selected from the group consisting of Type 444 stainless steel, Nickel 201, Nickel Alloy 625, Type 347 stainless steel, or other stainless steel or nickel based alloys and the second set of fins are made of a titanium base alloy or from the group of alloys the first fin is selected from.

In a further aspect of the present invention, a plate-fin type heat exchanger comprises a plurality of plate members made of a titanium or a titanium-based alloy; a first set of fins brazed between two of the plurality of plate members, with a braze filler, to form a first fluid passageway therein; the first set of fins being made of a base metal different from the plurality of plate members; a second set of fins brazed between one of the plate members brazed to the first set of fins and another plate member, with the braze filler, to form a second fluid passageway therein; the second set of fins made of a base metal similar to or different from the plurality of plate members; a third set of fins brazed between one of the plate members brazed to the second set of fins and another plate member, with the braze filler, to form a third fluid passageway therein; the third set of fins made of a base metal different from the plurality of plate members; a fourth set of fins brazed between one of the plate members brazed to the third set of fins and another plate member, with the braze filler, to form a fourth fluid passageway therein; the fourth set of fins made of a base metal similar to or different from the plurality of plate members; the braze filler is composed of about 40% Ti, 20% Zr, 20% Cu and 20% Ni; and the first set of finsand the third set of fins are made of a metal selected from the group consisting of Type 444 stainless steel, Nickel 201, Nickel Alloy 625, Type 347 stainless steel, or other stainless steel or nickel based alloys and the second set of fins and the fourth set of fins are made of a titanium base alloy or from the group of alloys the first fin is selected from.

In still a further aspect of the present invention, a method for making a plate-fin type heat exchanger comprises brazing, with a braze filler, a first set of fins between a first and second plate member to form a first fluid passageway therein, wherein the first set of fins are made of a metal different from that of the first and second plate members; and brazing, with the braze filler, a second set of fins between one of the first and second plate members and a third plate member to form a second fluid passageway therein, wherein the second set of fins are made of a metal different from that of the first, second and third plate members.

These and other features, aspects and advantages of the present invention will become better understood with reference to the following drawings, description and claims.

DETAILED DESCRIPTION OF THE INVENTION

Figure 1:
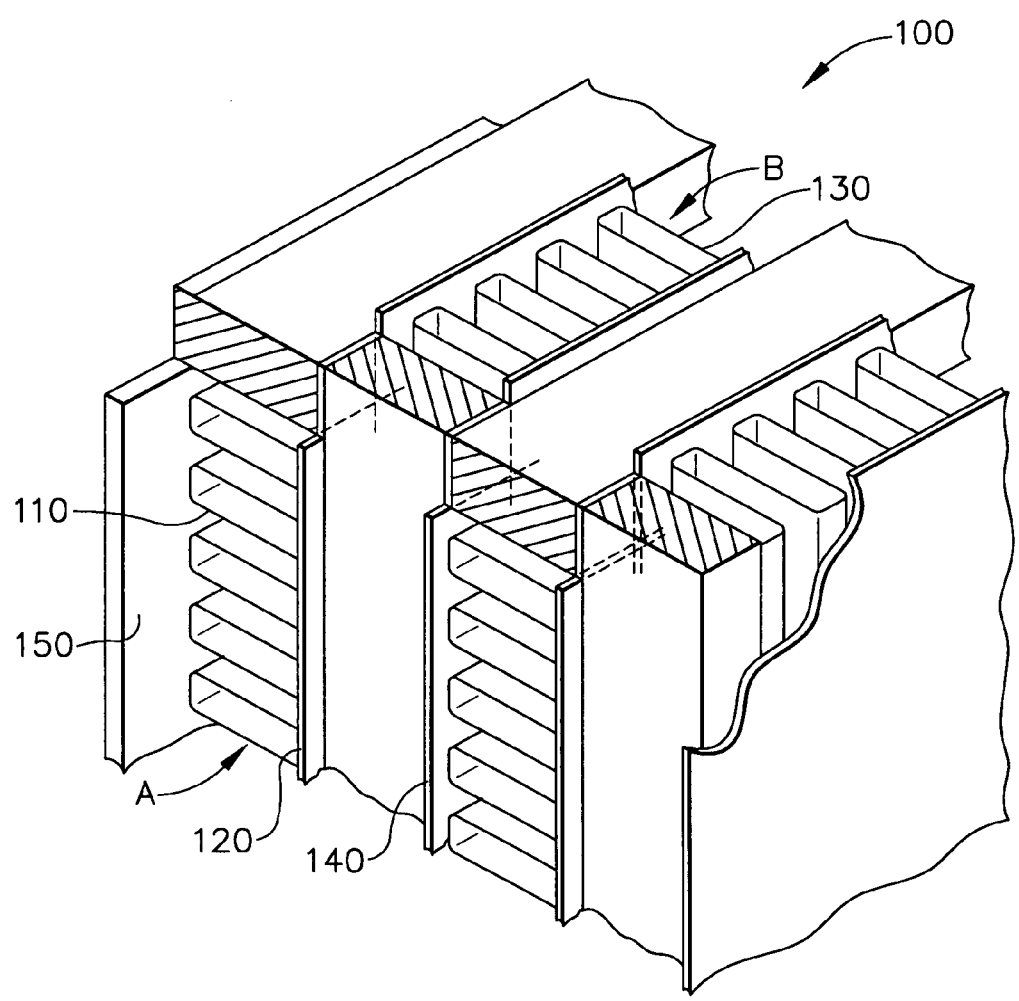
FIG. 1 is a perspective view of a conventional heat exchanger.

The following detailed description is of the best currently contemplated modes of carrying out the invention. The description is not to be taken in a limiting sense, but is made merely for the purpose of illustrating the general principles of the invention, since the scope of the invention is best defined by the appended claims.

The present invention provides a heat exchanger of the plate-fin type having fins of one base metal brazed to a plate made of a different base metal for use in oil coolers, condensers, evaporators, and the like. A base metal is the major metallic element in a metal alloy. More specifically, the distortion-prone titanium fins described in the background section may be replaced with another metal, such as a stainless steel or nickel based alloy to provide a structure that is resistant to crushing at the brazing temperature. Fluid or air flow resistance (pressure drop) through the heat exchanger may also be improved if the selected fin metal forms better fin shapes and has less burrs than titanium fins. The replacement material may also improve the heat transfer performance of the heat exchanger if the selected fin metal has higher thermal conductivity than titanium.

Conventional heat exchangers often use titanium plates and fins due to the light weight and high heat capacity of the material. These conventional heat exchangers, however, have a problem with fin distortion during the brazing step in the manufacturing process. Titanium fins that are tall, thin and widely spaced have even greater difficulty in supporting the loads imposed on them by the fixture and heat exchanger sections on top of them. This often leads to crushing of the fins as well as unbrazed areas within the heat exchanger. Furthermore, tall fins are difficult to form out of titanium due to cracking and the presence of burrs on offset fins.

The heat exchanger of the present invention attempts to solve these problems faced in conventional heat exchangers by replacing the distortion-prone titanium fins with another metal to provide a structure that is resistant to crushing, that may form better fin shapes with less burrs, and that may have a higher thermal conductivity than titanium.

The present invention is implemented by making a plate-fin type heat exchanger by using conventional titanium or titanium alloys for the material of the plates, and a different metal for the material of the fins. The fin material may be selected from any metal suitable for shaping and forming into a fin that has strength sufficient to resist crushing of the heat exchanger at operating conditions. Such a metal includes, but is not limited to, type 444 (18 Cr-2 Mo, or simply Type 444) stainless steel, nickel 201, nickel alloy 625 (Ni-21Cr-9Mo-2.5Fe) and type 347 stainless steel (18 Cr-10 Ni—Cb).

The joining of the non-titanium-based alloy fins with the remainder of the titanium heat exchanger is of particular concern when designing such a multiple metal based heat exchanger. The present inventors have found that by using a titanium based filler material, a clean, smooth and strong bond can be made between the titanium based plates and the non-titanium based fins. A suitable titanium based filler material may have a composition of about 30 to about 50 wt % titanium, about 15 to about 25 wt % zirconium, about 15 to about 25 wt % copper, and about 15 to about 25 wt % nickel. A preferred filler material may have a composition of about 35 to about 45 wt % titanium, about 17 to about 23 wt % zirconium, about 17 to about 23 wt % copper, and about 17 to about 23 wt % nickel. A titanium based filler material that was successfully used was composed of 40% Ti, 20% Zr, 20% Cu and 20% Ni (TI20ZR20CU20NI).

Plate-fin type heat exchangers of the present invention may be made of any suitable size and shape, including those having cross and counter-current flows. The Examples below use a 1"×1" square block to make the heat exchanger sample for the purposes of testing the brazing properties of the bi-metallic plate-fin heat exchanger design of the present invention. The present invention, however, is not meant to be so limited. Heat exchanger sizes and shapes may be adjusted accordingly for use in a particular environment.

EXAMPLES

Figure 2:
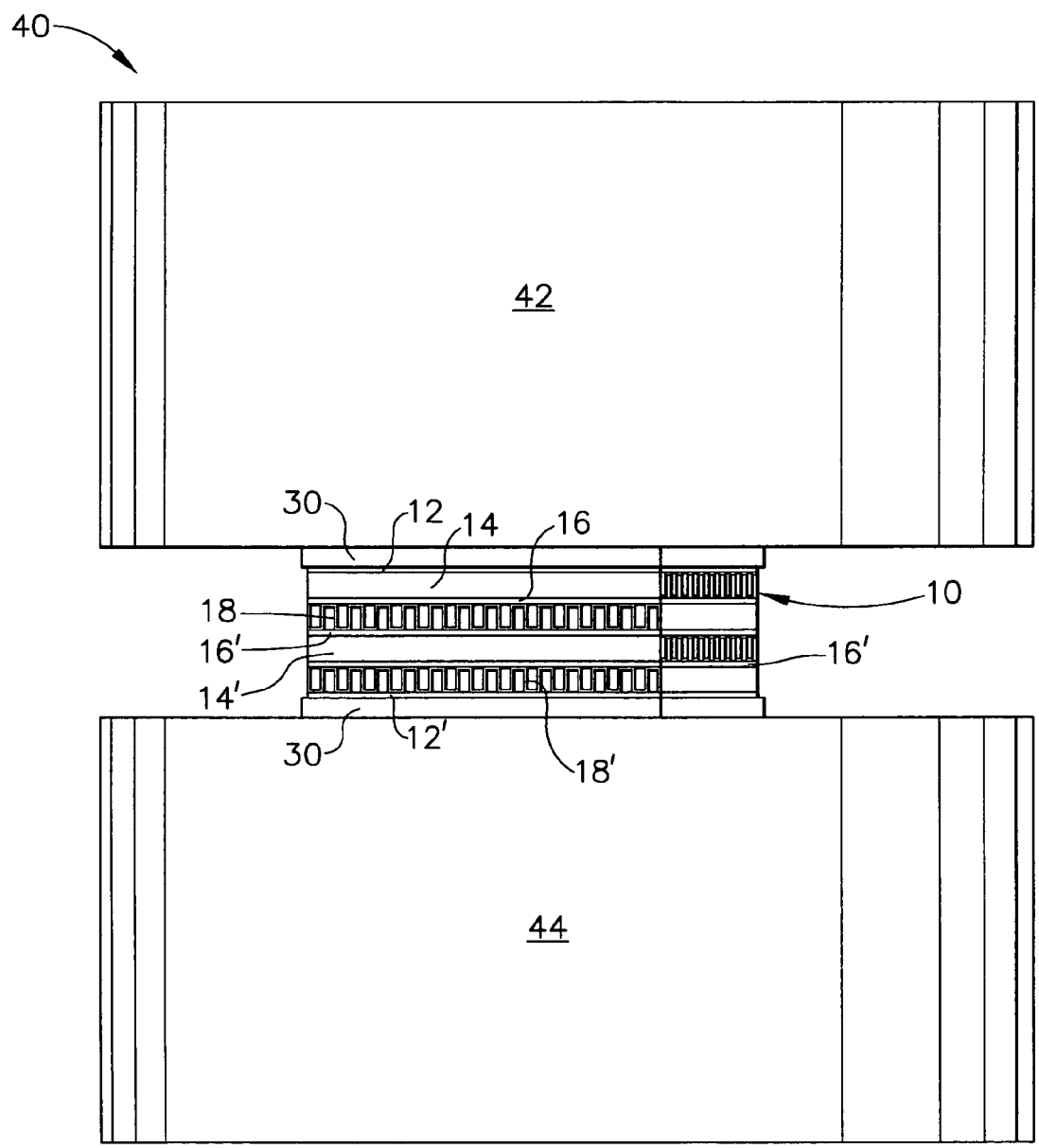
FIG. 2 is a side view of a brazed sample, according to the present invention, epoxy bonded to grips.
Figure 3:
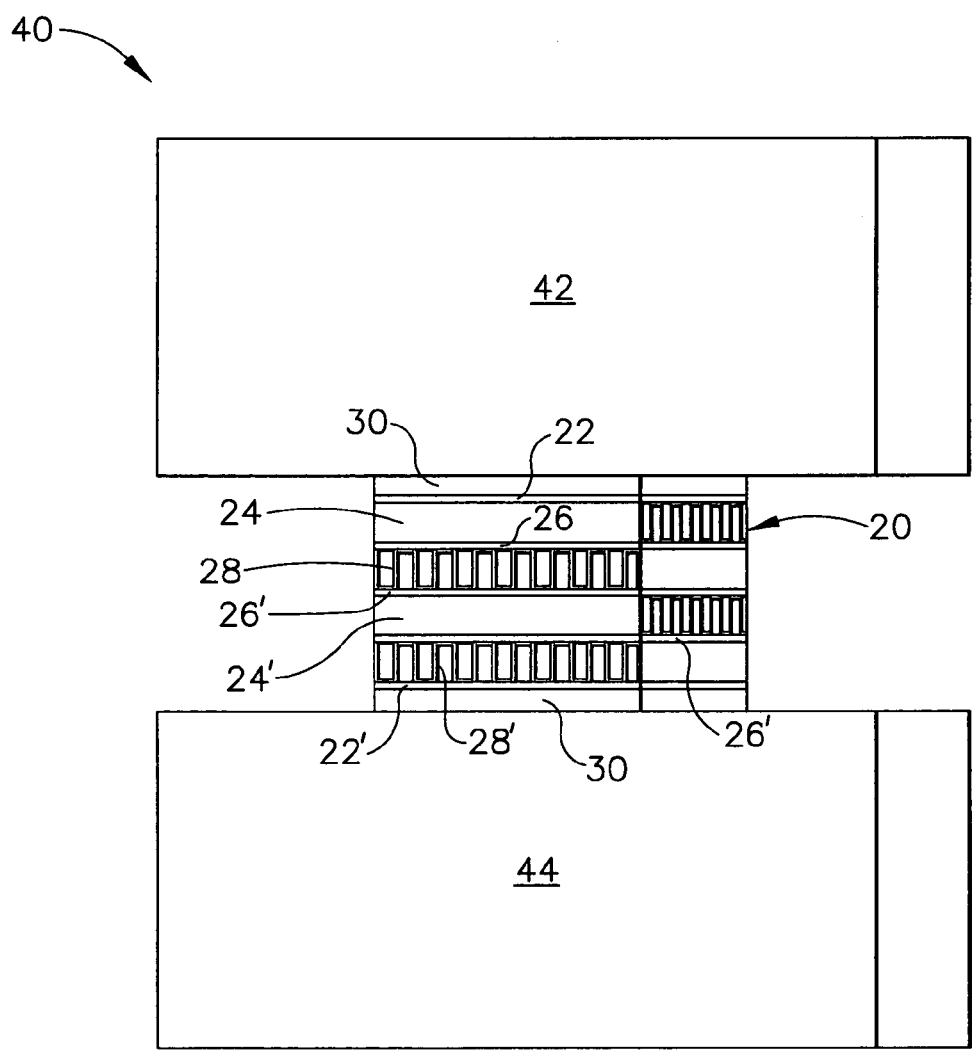
FIG. 3 is a side view of another brazed sample, according to the present invention, epoxy bonded to grips.

Referring to FIGS. 2 and 3, there are shown side views of a closely-spaced heat exchanger 10 and a widely-spaced heat exchanger 20, respectively, both being bonded with an epoxy 30 to grips 40. The term "top" and "bottom" as used in the description of these examples refers to the top and bottom of the page as depicted in FIGS. 2 and 3. All brazing in the examples was done in a vacuum at approximately 1600° F.

Example 1

Referring now to FIG. 2, closely-spaced heat exchanger 10 was made as a 1"×1" square with four passes arranged in a counter-current flow configuration. More specifically, a top plate 12, made from 0.005" Ti-21S, was bonded with epoxy 30 to top grip plate 42. A first set of fins 14 was made from Type 444 stainless steel and brazed to one side of top plate 12 with 0.18 g/in² TI20ZR20CU20NI braze filler. First set of fins 14 was arranged to provide a flow in a first direction. A middle plate 16, made the same as top plate 12, was brazed to the other side of first set of fins 14 with the same TI20ZR20CU20NI braze filler. A second set of fins 18 was made from Type 444 stainless steel and brazed to one side of middle plate 16. Second set of fins 18 was arranged to provide a flow in a direction perpendicular to the first direction. A second middle plate 16' was brazed with the same TI20ZR20CU20NI braze filler to the other side of second set of fins 18. The same procedure was followed for a third set of fins 14' and a fourth set of fins 18'. Finally, a bottom plate 12', brazed on one side to fourth set of fins 18', was bonded with epoxy 30 to bottom grip 44.

Example 2

Referring now to FIG. 3, widely-spaced heat exchanger 20 was made as a 1"×1" square with four passes arranged in a counter-current flow configuration. More specifically, a top plate 22, made from 0.005" Ti-21S, was bonded with epoxy 30 to top grip plate 42. A first set of fins 24 was made from Type 444 stainless steel and brazed to one side of top plate 22 with 0.18 g/in² TI20ZR20CU20NI braze filler. First set of fins 24 was arranged to provide a flow in a first direction. A middle plate 26, made the same as top plate 22, was brazed to the other side of first set of fins 24 with the same TI20ZR20CU20NI braze filler. A second set of fins 28 was made from Type 444 stainless steel and brazed to one side of middle plate 26. Second set of fins 28 was arranged to provide a flow in a direction perpendicular to the first direction. A second middle plate 26' was brazed with the same TI20ZR20CU20NI braze filler to the other side of second set of fins 28. The same procedure was followed for a third set of fins 24' and a fourth set of fins 28'. Finally, a bottom place 22', brazed on one side to fourth set of fins 28', was bonded with epoxy 30 to bottom grip 44.

Example 3

A second closely-spaced heat exchanger was prepared in a manner and of materials the same as those used for Example 1.

Example 4

A widely-spaced heat exchanger was prepared in a manner similar to that used for Example 1, however, the Type 444 stainless steel fins used in Example 1 were replaced with Ni-201 fins.

Results

Table 1 shows the results of a tensile test for the four above described examples. Grips 42 and 44 were pulled apart with the test subject epoxy bonded thereto. The breaking load and failure locations were noted.

TABLE 1

Plate-Fin Heat Exchanger Tensile Results

| Example | Breaking load (pounds) | Failure Location |
|---|---|---|
| 1 | 2270 | Brazed joint |
| 2 | 330 | Brazed joint |
| 3 | 1810 | Brazed joint |
| 4 | 476 | Epoxy |

The above results show excellent bonding between the Ti-21S plate material with the non-titanium based fin material. The table shows excellent brazing between the closely-spaced Type 444 stainless steel fins with the Ti-21S plate material (Examples 1 and 3). Adequate brazing was also demonstrated with the widely-spaced Type 444 stainless steel fin material (Example 2). The exact fin/plate tensile strength could not be determined specifically for the example using the Ni-201 fin material (Example 4). This sample detached at the epoxy bond before the brazed fin broke. Therefore, the brazed joint breaking load was >476 pounds.

When the heat exchanger of Example 1, having Type 444 stainless steel fins, was brazed to the Ti-21S sheet, the fin-to-sheet joints had large smooth fillets with good wetting, as evidenced by small contact angles at the toe of the fillets. No erosion of the Type 444 stainless steel fins was noted.

When the heat exchanger of Example 2, having Type 444 stainless steel fins, was brazed to the Ti-21S sheet, the fin-to-sheet joints had large smooth fillets with good wetting, as evidenced by small contact angles at the toe of the fillets. Again, no erosion of the Type 444 stainless steel fins was noted.

Furthermore, when the heat exchanger of Example 4, having Nickel-201 fins, was brazed to the Ti-21S sheet, the fin-to-sheet joint had large smooth fillets with good wetting. No erosion of the Nickel-201 fins was noted.

It should be understood, of course, that the foregoing relates to preferred embodiments of the invention and that modifications may be made without departing from the spirit and scope of the invention as set forth in the following claims. Such modifications could be heat exchangers with more or less numbers of passages, fin materials that alternate in passage-pairs or that have variations in base metal throughout the heat exchanger stack, metal plates and closure bars that are made from non-titanium base metal, fins that are all titanium base with plates or closure bars that are non-titanium base metal, or plates, fins and bars made from other titanium alloys such as Ti-15-3-3-3, Ti-21S, Ti-3.2.5, Commercially Pure Titanium, Ti-6-2-4-2, Ti-6-4 as examples.

We claim:

1. A heat exchanger, comprising:
a plurality of plate members made of a titanium or a titanium-based alloy;
a first set of fins brazed between two of said plurality of plate members, with a braze filler, to form a first fluid passageway therein, said braze filler being a titanium-based braze filler;
said first set of fins being made of a base metal different from said plurality of plate members;
a second set of fins brazed between one of said plate members brazed to said first set of fins and another plate member, with said braze filler, to form a second fluid passageway therein; and
said second set of fins made of a second base metal similar to or different from said plurality of plate members.

2. The heat exchanger of claim 1, wherein said braze filler is able to braze materials at a temperature of less than 1800° F.

3. The heat exchanger of claim 1, wherein said braze filler is able to braze materials at a temperature of less than 1700° F.

4. The heat exchanger of claim 1, wherein said braze filler is composed of titanium, copper, and nickel.

5. The heat exchanger of claim 1, wherein said braze filler is composed of titanium, zirconium, copper, and nickel.

6. The heat exchanger of claim 1, wherein said braze filler comprises about 35 to about 45 weight percent Ti, about 17 to about 23 weight percent Zr, about 17 to about 23 weight percent Cu and about 17 to about 23 weight percent Ni.

7. The heat exchanger of claim 1, wherein said braze filler is 40% Ti, 20% Zr, 20% Cu and 20% Ni.

8. The heat exchanger of claim 1, wherein said plurality of plate members are made of Ti-21S.

9. The heat exchanger of claim 1, wherein said first set of fins are made of a stainless steel or nickel based alloy and said second set of fins are made of a stainless steel, nickel based alloy, or titanium based alloy.

10. The heat exchanger of claim 1, wherein said first set of fins and said second set of fins are made of a metal selected from the group consisting of Type 444 stainless steel, Nickel 201, Nickel Alloy 625 and Type 347 stainless steel.

11. The heat exchanger of claim 10, wherein said first fin metal is Type 444 stainless steel.

12. The heat exchanger of claim 1, further comprising:
a third set of fins brazed between one of said plate members brazed to said second set of fins and another plate member, with said braze filler, to form a third fluid passageway therein;
said third set of fins made of a third base metal similar to or different from said plurality of plate members;
a fourth set of fins brazed between one of said plate members brazed to said third set of fins and another plate member, with said braze filler, to form a fourth fluid passageway therein; and
said fourth set of fins made of a fourth base metal similar to or different from said plurality of plate members.

13. The heat exchanger of claim 12, wherein said first fluid passageway and said third fluid passageway are in the same direction and are perpendicular to said second fluid passageway and said fourth fluid passageway.

14. The heat exchanger of claim 1, wherein said braze filler creates a bond having a tensile breaking strength of at least 300 pounds over a one square inch section of brazed fins.

15. The heat exchanger of claim 1, wherein said braze filler creates a bond without excessive erosion of said plurality of plate members.

16. A heat exchanger comprising:
a plurality of plate members made of a titanium or a titanium-based alloy;
a first set of fins brazed between two of said plurality of plate members, with a braze filler, to form a first fluid passageway therein, said braze filler being a titanium-based braze filler;
said first set of fins being made of a base metal different from said plurality of plate members;
a second set of fins brazed between one of said plate members brazed to said first set of fins and another plate member, with said braze filler, to form a second fluid passageway therein;
said second set of fins made of a second base metal similar to or different from said plurality of plate members; and
said braze filler is able to braze materials at a temperature of less than 1700° F.

17. The heat exchanger of claim 16, wherein said braze filler is 40% Ti, 20% Zr, 20% Cu and 20% Ni.

18. The heat exchanger of claim 17, wherein said plurality of plate members are made of Ti-21S; and said first set of fins and said second set of fins are made of a metal selected from the group consisting of type 444 stainless steel, nickel 201, nickel alloy 625 and type 347 stainless steel.

19. The heat exchanger of claim 18, wherein said first set of fins and said second set of fins are made of type 444 stainless steel.

20. The heat exchanger of claim 16, wherein said plurality of plate members are made of Ti-21S; and said first set of fins are made of a metal
selected from the group consisting of Type 444 stainless steel, Nickel 201, Nickel Alloy 625 and Type 347 stainless steel, and said second set of fins are made of a metal selected from the group consisting of Titanium-15-3-3-3, Titanium-21S, Titanium 3-2.5, CP-Ti, Type 444 stainless steel, Nickel 201, Nickel Alloy 625 and Type 347 stainless steel.

21. The heat exchanger of claim 16, further comprising:
a third set of fins brazed between one of said plate members brazed to said second set of fins and another plate member, with said braze filler, to form a third fluid passageway therein;
said third set of fins made of a third base metal similar to or different from said plurality of plate members;
a fourth set of fins brazed between one of said plate members brazed to said third set of fins and another plate member, with said braze filler, to form a fourth fluid passageway therein; and
said fourth set of fins made of a fourth base metal similar to or different from said plurality of plate members.

22. The heat exchanger of claim 16, wherein:
said braze filler creates a bond having a tensile breaking strength of at least 300 pounds over a one square inch section of brazed fins; and
said braze filler creates a bond without excessive erosion of said plurality of plate members.

23. A plate-fin type heat exchanger comprising:
a plurality of plate members made of a titanium or a titanium-based alloy;
a first set of fins brazed between two of said plurality of plate members, with a braze filler, to form a first fluid passageway therein;
said first set of fins being made of a base metal different from said plurality of plate members;
a second set of fins brazed between one of said plate members brazed to said first set of fins and another plate member, with said braze filler, to form a second fluid passageway therein;
said second set of fins made of a second base metal similar to or different from said plurality of plate members;
said braze filler comprises about 35 to about 45 weight percent Ti, about 17 to about 23 weight percent Zr, about 17 to about 23 weight percent Cu and about 17 to about 23 weight percent Ni; and
said first set of fins are made of a metal selected from the group consisting of Type 444 stainless steel, Nickel 201, Nickel Alloy 625 and Type 347 stainless steel, and said second set of fins are made of a metal selected from the group consisting of Titanium-15-3-3-3, Titanium-21S, Titanium 3-2.5, CP-Ti, Type 444 stainless steel, Nickel 201, Nickel Alloy 625 and Type 347 stainless steel.

24. The plate-fin type heat exchanger of claim 23, wherein said braze filler is composed of 40% Ti, 20% Zr, 20% Cu and 20% Ni.

25. The plate-fin type heat exchanger of claim 23, wherein:
said plurality of plate members are made of Ti-21S and;
said first set of fins and said second set of fins are made of type 444 stainless steel.

26. The plate-fin type heat exchanger of claim 23, wherein:
said plurality of plate members are made of Ti-21S and;
said first set of fins are made of type 444 stainless steel and said second set of fins are made of Ti-15-3-3-3.

27. The plate-fin type heat exchanger of claim 23, wherein:
said plurality of plate members are made of Ti-21S and;
said first set of fins are made of type 444 stainless steel and said second set of fins are made of Ti-21S.

28. The plate-fin type heat exchanger of claim 23, wherein:
said plurality of plate members are made of Ti-21S and;
said first set of fins are made of type 444 stainless steel and said second set of fins are made of Ti-3-2.5.

29. The plate-fin type heat exchanger of claim 23, wherein:
said plurality of plate members are made of Ti-21S and;
said first set of fins are made of type 444 stainless steel and said second set of fins are made of CP-Ti.

30. The plate-fin type heat exchanger of claim 23, further comprising:
a third set of fins brazed between one of said plate members brazed to said second set of fins and another plate member, with said braze filler, to form a third fluid passageway therein;
said third set of fins made of a third base metal similar to or different from said plurality of plate members;
a fourth set of fins brazed between one of said plate members brazed to said third set of fins and another plate member, with said braze filler, to form a fourth fluid passageway therein;
said fourth set of fins made of a fourth base metal similar to or different from said plurality of plate members; and
said third set of fins and said fourth set of fins are made of a metal selected from the group consisting of type 444 stainless steel, nickel 201, nickel alloy 625 and type 347 stainless steel.

31. The plate-fin type heat exchanger of claim 30, wherein said first fluid passageway and said third fluid passageway are in the same direction and are perpendicular to said second fluid passageway and said fourth fluid passageway.

32. A plate-fin type heat exchanger comprising:
a plurality of plate members made of a titanium or a titanium-based alloy;
a first set of fins brazed between two of said plurality of plate members, with a braze filler, to form a first fluid passageway therein;
said first set of fins being made of a base metal different from said plurality of plate members;
a second set of fins brazed between one of said plate members brazed to said first set of fins and another plate member, with said braze filler, to form a second fluid passageway therein;
said second set of fins made of a second base metal different from said plurality of plate members;
a third set of fins brazed between one of said plate members brazed to said second set of fins and another plate member, with said braze filler, to form a third fluid passageway therein;
said third set of fins made of a third base metal different from said plurality of plate members;
a fourth set of fins brazed between one of said plate members brazed to said third set of fins and another plate member, with said braze filler, to form a fourth fluid passageway therein;

said fourth set of fins made of a fourth base metal different from said plurality of plate members;
said braze filler is composed of 40% Ti, 20% Zr, 20% Cu and 20% Ni; and
said first set of fins, said second set of fins, said third set of fins and said fourth set of fins are made of a metal selected from the group consisting of type 444 stainless steel, nickel 201, nickel alloy 625 and type 347 stainless steel.

33. A method for making a plate-fin type heat exchanger comprising:
brazing, with a braze filler, a first set of fins between a first and second plate member to form a first fluid passageway therein, wherein said first set of fins are made of a metal different from that of said first and second plate members and wherein said first and second plate members are made of titanium or a titanium-based alloy; and
brazing, with said braze filler, a second set of fins between one of said first and second plate members and a third plate member to form a second fluid passageway therein, wherein said second set of fins are made of a metal similar to or different from that of said first, second and third plate members, and wherein said third plate member is made of titanium or a titanium-based alloy, and wherein said braze filler is a titanium-based braze filler.

34. The method of claim 33, wherein said brazing steps are carried out at a temperature of less than 1700° F., thereby reducing erosion of said first, second and third plate members.

35. The method of claim 33, wherein:
said braze filler comprises about 35 to about 45 weight percent Ti, about 17 to about 23 weight percent Zr, about 17 to about 23 weight percent Cu and about 17 to about 23 weight percent Ni;
said first, second and third plate members are made of Ti-21S; and
said first set of fins are made of a metal selected from the group consisting of type 444 stainless steel, nickel 201, nickel alloy 625 and type 347 stainless steel, and said second set of fins are made of a metal selected from the group consisting of Titanium-15-3-3-3, Titanium-21S, Titanium 3-2.5, CP-Ti, Type 444 stainless steel, Nickel 201, Nickel Alloy 625 and Type 347 stainless steel.

36. The method of claim 35, wherein said braze filler is composed of 40% Ti, 20% Zr, 20% Cu and 20% Ni.

37. The method of claim 33, further comprising:
brazing, with said braze filler, a third set of fins between said third plate member and a fourth plate member to form a third fluid passageway therein, wherein said third set of fins are made of a metal similar to or different from that of said first, second, third and fourth plate members; and
brazing, with said braze filler, a fourth set of fins between said fourth plate member and a fifth plate member to form a fourth fluid passageway therein, wherein said fourth set of fins are made of a metal similar to or different from that of said first, second, third, fourth and fifth plate members.

38. The method of claim 33, further comprising:
orienting said first and third fluid passageways in a first direction; and
orienting said second and fourth fluid passageways in a second direction, perpendicular to said first direction.

* * * * *